March 23, 1965
L. P. FRECHETTE ET AL
3,174,609
TWO STAGE COMBINATION CAM AND SPRING
POWERED CASE SHIFT MECHANISM
Filed Aug. 8, 1963
3 Sheets-Sheet 1
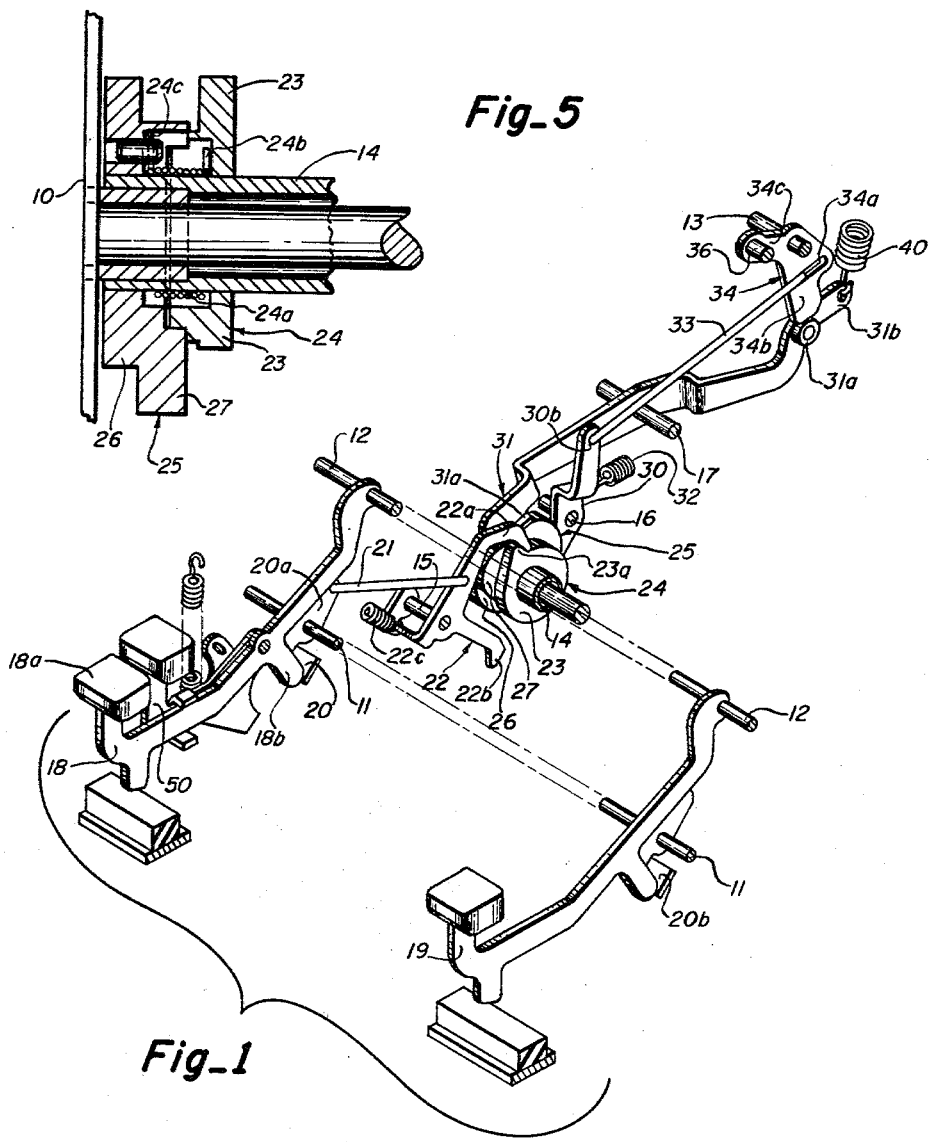
INVENTORS
LEO P. FRECHETTE
HAROLD D. GAUDET
BY Thomas S. Ross
James L. Black
ATTORNEYS

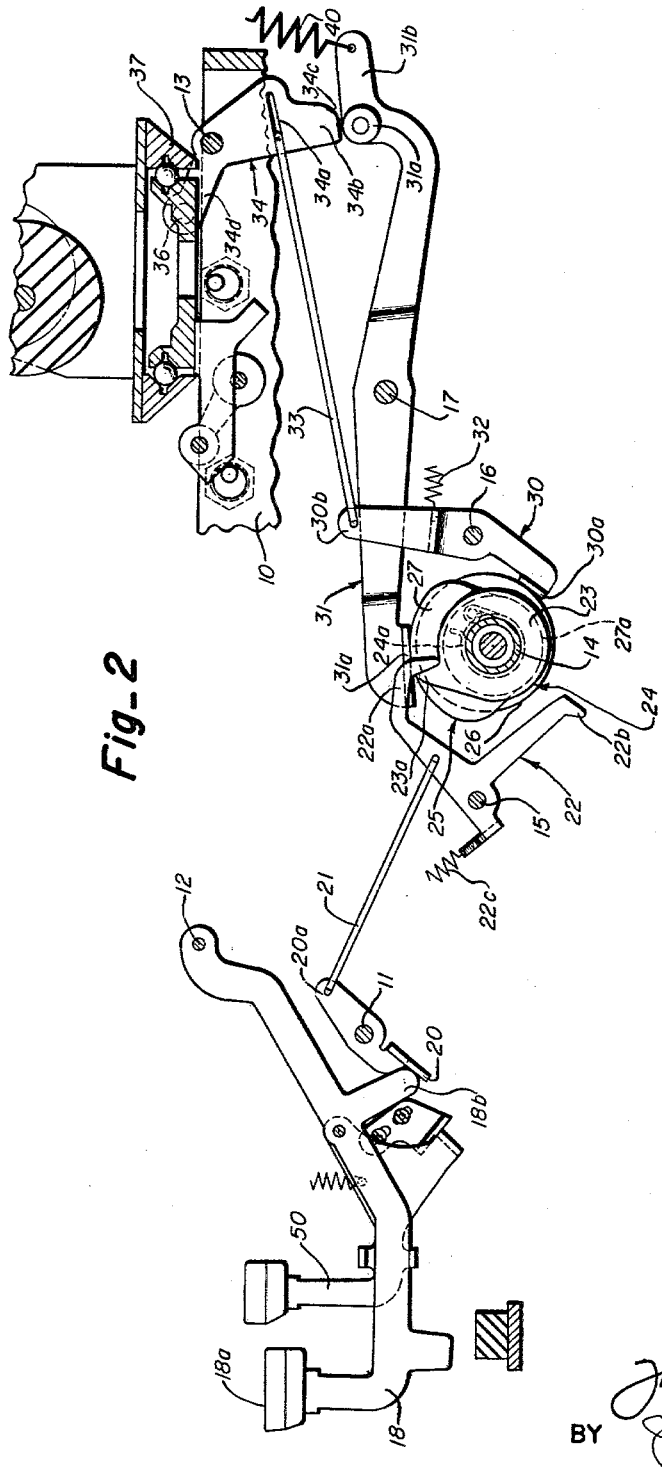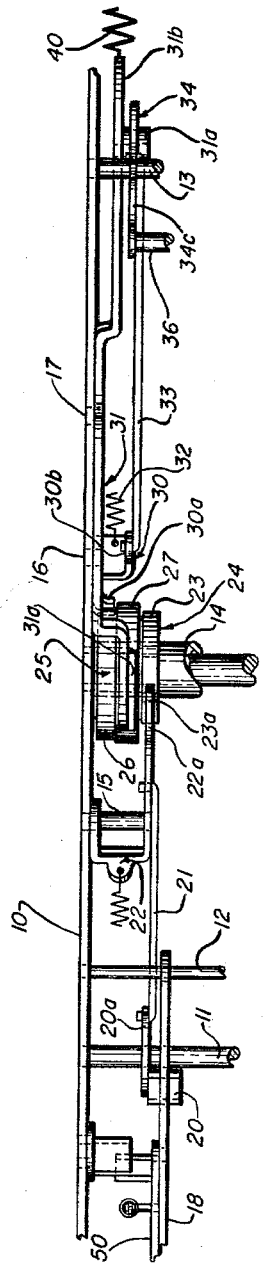

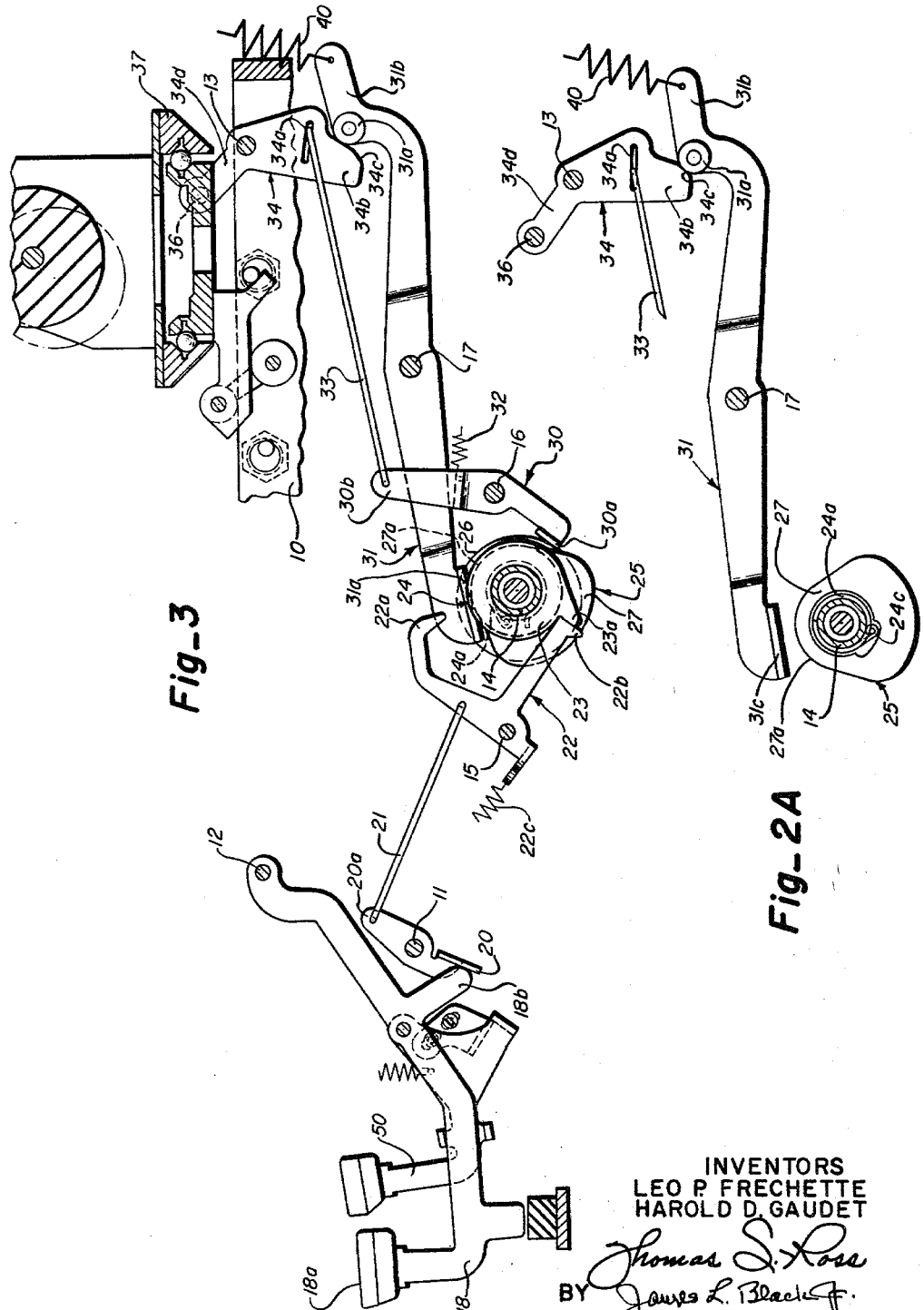

United States Patent Office 3,174,609
Patented Mar. 23, 1965

3,174,609
TWO STAGE COMBINATION CAM AND SPRING POWERED CASE SHIFT MECHANISM
Leo P. Frechette and Harold D. Gaudet, West Hartford, Conn., assignors to Royal McBee Corporation, New York, N.Y., a corporation of New York
Filed Aug. 8, 1963, Ser. No. 300,795
14 Claims. (Cl. 197—73)

This invention relates to a case shift mechanism for a writing machine and more particularly to a power driven case shift mechanism for an electric typewriter.

Case shift in electric typewriters is commonly effected either by elevating the type bar segment or the platen carriage. This invention is illustratively directed to case shift by carriage elevation although the embodiment disclosed is applicable to case shift by segment elevation. For many years, where it has been desired to provide powered carriage elevating mechanism, a power operated cam was used to operate linkages of various types to lift the carriage. Examples of such mechanisms are disclosed in U.S. patents to Crawley 1,455,109, Hart, 1,827,-431, Hart 1,929,064 and Kocka 2,069,671. As the demand for quietness in typewriter operation grew these devices proved less and less satisfactory. Furthermore, as printing cycle time was shortened, these actions lacked sufficient positiveness in operation and not infrequently under shifted thus spoiling copy.

Still further, these prior mechanisms have what might be called a "hard" action resulting in undesirable rebound characteristics, too rapid wear and the need for too frequent adjustment. Trouble was also encountered when the shift lock was used, particularly in machines adapted to write in excess of ten characters per second. Thus as electric typewriters became more sophisticated and operated at higher and higher speeds, various components thereof that had operated quite satisfactorily became less dependable.

It is accordingly one of the objects of the invention to provide a case shift mechanism that overcomes the above mentioned difficulties. Another object is to provide such a mechanism that is structurally simple, sturdy and inexpensive and that is capable of extended field service without repair or adjustment.

Other objects will be in part apparent and in part pointed out hereinafter.

In the drawing wherein there is shown a preferred embodiment of the invention and wherein similar reference characters refer to similar parts throughout the several views:

FIGURE 1 is a schematic isometric view of the mechanism;

FIGURE 2 is a side elevation of the mechanism in rest position;

FIGURE 2A is a side elevation of the mechanism in partially shifted position;

FIGURE 3 is a view similar to FIGURE 2 but showing the mechanism in shift position;

FIGURE 4 is a top plan view of the mechanism; and

FIGURE 5 is a section taken through the wrapped spring clutch and associated cams comprising elements of the mechanism.

In general the mechanism comprises shift key and shift key lock levers of conventional nature rockably mounted on a cross shaft carried by the machine frame. Each of these levers is arranged, upon depression, to rock an arm which is linked to a clutch trigger. The trigger includes two arms one of which normally holds a clutch, preferably of the wrapped spring type, disengaged and which is rockable by the said arm to effect clutch engagement. When the trigger is so rocked its other arm is interposed into position to effect disengagement of the clutch. The driving element of the clutch, upon clutch engagement, is coupled to a pair of cams, the clutch, the driving element and the cams being mounted on a power driven shaft that rotates constantly when the typewriter is in use. A pair of cam followers are rockably mounted on respective shafts carried by the machine frame, one follower being directly linked to a carriage lift crank rockably mounted on another shaft supported by the frame. When the clutch is engaged and the cams rotate, one of them actuates the follower that is linked to the shift crank to rock the crank and partially lift the carriage. Shortly thereafter the second cam permits rocking of its follower which is biased against the cam by a spring. This second follower carries a roll which, when this follower is rocked, engages a cam surface on the crank and continues the rocking thereof under the power of the said spring to complete the carriage elevation. Thus the initial carriage elevation is powered by the power shaft with the final elevation being effected by the spring. The carriage returns to its normal, i.e. unshifted, position by gravity.

What is of the essence of the invention is the provision of the spring powered follower lever that, under the permissive rotation of its cam and the diminishing drive of the spring completes the elevation of the carriage at a decelerating pace that provides a soft action, free from rebound and noise, and yet assures full shift elevation of the carriage. The softness of this action may be attributed to the diminishing power of the drive spring and the effect of the follower roll riding up the cam surface of the lift crank in such a manner that deceleration of upward carriage movement is attained smoothly to zero velocity at the upper end of its travel. The initial power stroke provided by the power shaft assures rapid initial acceleration to the carriage thus assuring its timely positioning at the printing position under the drive of the spring, but precludes slamming of the carriage at the top of its rise, thus eliminating rebound and noise.

More particularly and with reference to FIGURES 1 and 4 the typewriter includes a frame 10 which supports a plurality of cross shafts 11, 12 and 13, a power shaft 14 and three stud shafts 15, 16 and 17. Left and right hand key shift levers 18 and 19 are secured to cross shaft 12, a shift lock lever 50 of conventional nature being pivotally secured to lever 18 for its usual function. As levers 18 and 19 are the same, only lever 18 will be referred to below. Lever 18 carries the usual key 18a and includes a downwardly extending leg 18b which engages an arm 20 welded on cross shaft 11 so as to be rocked counterclockwise when lever 18 is depressed. Arm 20 includes an end 20a to which one end of a link 21 is connected. A generally similar arm 20b is associated with lever 19. Thus depression of either of levers 18 or 19 will rock arm 20 to pull link 21 to the left (FIGURES 1 and 2).

The other end of link 21 is connected to a trigger, generally indicated at 22 which is mounted on stud shaft 15, a spring 22c interconnecting the trigger and the machine frame to bias the trigger clockwise. Trigger 22 includes two arms 22a and 22b which coact with the tooth 23a of a one-toothed star wheel 23 which is freely mounted on power shaft 14 and comprises the driver member of a clutch generally indicated at 24. As shown in FIGURE 5, clutch 24 is of the wrapped spring type and accordingly includes a spring 24a having an interference fit on power shaft 14. One end 24b of clutch spring 24a is located in driver member 23 while the other end 24c of the spring nests in a driven member, generally indicated at 25, comprising a pair of cams 26 and 27 freely mounted on shaft 14. Tooth 23a of driver 23 is normally held by trigger arm 22a which maintains clutch 24 in disengaged condition. When the trigger is rocked counterclockwise as the result of depression of any of shift levers 18, 19 or 20, driver tooth 23a is released permitting spring 24a to clutch power shaft 14 thus connecting the driver 23 and the cams 26 and 27 to the power shaft so as to be rotated thereby.

When the trigger is rocked as described its interposer arm 22b is moved into position to intercept star wheel tooth 23a after it has rotated about 240°. Such interception disengages clutch 24 and the cams 26 and 27 come to a halt. This condition occurs if any of levers 18, 19 or 20 is held depressed. If either lever 18 or 19 is released before completion of the 240° rotation, driver tooth 23a will be intercepted by trigger arm 22a to disengage the clutch 24.

Cams 26 and 27 (FIGURE 2) have associated followers respectively generally indicated at 30 and 31 and, hereinafter, referred to respectively as the up shift follower and the up-shift return follower. Follower 30 is mounted on stud shaft 16 and includes a shoe 30a which is held in engagement with the surface of cam 26 by a spring 32 interconnecting the machine frame and arm 30b of follower 30. To arm 30b is fastened one end of a link 33 the other end of which is received in a lost motion slot 34a formed in one arm 34b of a carriage lift crank generally indicated at 34 welded to cross shaft 13 near one end thereof. A generally similar crank (but without a slot like slot 34a) is welded to shaft 13 near the other end thereof. These cranks include arms such as arm 34d which are connected by appropriate linkage 36 to the elevatable carriage 37 to elevate the carriage to shift case when the cranks are rocked in a manner described below.

With reference to FIGURE 2 (unshifted condition) and FIGURE 3 (shifted condition) it will now appear that when trigger 22 is rocked by depression of one or another of the shift keys, clutch 24 engages causing rotation of cams 26 and 27. As cam 26 rotates, it drives its follower 30 counterclockwise pulling link 33 to the left to rock carriage lift crank 34 clockwise to a location (see FIGURE 2A) between the FIGURE 2 and FIGURE 3 positions thus partially elevating the carriage. It should be noted that crank 34 includes a cam surface 34c adapted to be engaged by a carriage crank drive roller 31a mounted on the right hand end 31b of follower 31. This end 31b of follower 31 anchors one end of a drive spring 40, the other end of which is fastened to the machine frame. At the FIGURE 2A position cam 26, because of its contour, ceases to drive its follower 30 and accordingly there is no further power input from shaft 14 to crank 34. However, at this point, crank 34 has been rocked to the FIGURE 2A position in which location carriage crank drive roller 31a on the upshift-shift return follower 31 takes over the shifting action and is powered by drive spring 40. Roller 31a is accordingly in position to engage cam surface 34c on crank 34. Follower 31 includes a shoe 31c that follows the surface of cam 27, being biased thereagainst by drive spring 40. When this cam has rotated to the FIGURE 2A position, shoe 31c, under the bias of spring 40 approaches the smaller diameter dwell 27a. In reaching this position follower 31 rocks counterclockwise and its roller 31a is forced against cam 34c on crank 34 by spring 40 to continue clockwise rotation of crank 34 to complete the elevation or up shift of the carriage (see FIGURE 3). Cam 34c is so contoured that the final elevation or the last portion of the up-shift of the carriage is effected by roller 31a at a decelerating pace so that the carriage finally comes to rest in its elevated position smoothly, noiselessly and with no possibility of rebound or undershift.

If shift key 18, for example, is held depressed or if shift key lock 50 is used, interposer arm 22b of trigger 22 engages star wheel tooth 23a to disengage clutch 24 to stop rotation of cams 26 and 27 at a position where follower shoe 31c rests against cam dwell 27a and the carriage remains elevated. During rotation of the cams, follower 30, after its initial counterclockwise movement to initiate carriage elevation, rocks clockwise which it is able to do by reason of the provision of lost motion slot 34a in crank 34.

Upon release of the shift key or the shift key lock, trigger 22, pulled clockwise by spring 22c, resumes its FIGURE 2 position thus releasing interposer arm 22b from tooth 23a and interposing trigger arm 22a in the path of tooth 23a. Release of the tooth by arm 22b effects engagement of clutch 24 causing rotation of cams 26 and 27 to the FIGURE 2 position where the tooth re-engages trigger arm 22a to result in clutch disengagement to end the shift and unshift cycle. During this rotation of the cams, their followers 30 and 31 downshift and the carriage returns to its normal lower case position. Cam 26 might be considered a permissive instrumentality, i.e. a portion of its rotation or operative cycle permits spring 40 to lift the carriage to upper case position while the final portion of its rotation overpowers spring 40 to permit gravity to lower the carriage to its lower case or normal position.

It will now appear that we have provided a case shift mechanism that attains the several objects set forth above in a thoroughly practical and efficient manner.

As other embodiments of the invention are possible and as modifications of the one disclosed may be made, all without departing from the scope of the invention it is to be understood that the foregoing should be interpreted as illustrative and not in a limiting sense.

We claim:

1. A case shift mechanism for an electric typewriter having a liftable carriage, in combination,
   a frame having a plurality of shafts mounted thereon,
   a shift key lever mounted on one of said shafts,
   a rockable clutch trigger mounted on another of said shafts,
   means forming a connection between said lever and trigger whereby depression of the lever rocks the trigger,
   a constantly rotating shaft mounted on said frame,
   a clutch comprising driver and driven members, said driven member being normally engaged by said trigger to hold said clutch disengaged, rocking of said trigger effecting engagement of said clutch, said driven member including a pair of cams,
   a rockable carriage lift crank mounted on another of said shafts,
   and means responsive to rotation of said cams to sequentially rock said lift crank first through part of its stroke and then through the rest of its stroke.

2. Mechanism according to claim 1 wherein said responsive means includes a follower associated with one of said cams and with said crank, and means operative upon rotation of said one cam to actuate said follower to rock said crank.

3. Mechanism according to claim 2 wherein said responsive last mentioned means includes a follower associated with one of said cams and with said crank, and spring means operative upon rotation of said one cam to actuate said follower to rock said crank.

4. A case shift mechanism for an electric typewriter having a liftable carriage, in combination,
   a frame having a plurality of shafts mounted thereon,
   a shift key lever mounted on one of said shafts,
   an arm mounted on another of said shafts and engageable by said lever so as to be rocked thereby upon depression thereof,
   a rockable clutch trigger mounted on another of said shafts,
   a link interconnecting said arm and said trigger whereby rocking of said arm rocks said trigger,
   a constantly rotating shaft mounted on said frame,
   a clutch comprising driver and driven members, said driver member being normally engaged by said trigger to hold said clutch disengaged, said driven member including a pair of cams, a rockable carriage lift crank mounted on another of said shafts, a cam follower linked to said crank and rockably mounted on another of said shafts and engaging one of said cams, said one cam being contoured to rock said follower an amount to partially rock said crank, a second cam follower rockably mounted on another of said shafts and engaging the other of said cams, said second follower carrying a roller adapted to engage a cam surface formed on said crank, and a spring interconnecting said frame and said second follower to bias said roller against said cam surface whereby upon engagement of said clutch and rotation of said cams said first cam effects partial rocking of said crank after which said second cam permits its follower to further rock said crank by reason of the bias of said spring forcing said roller against the said cam surface on said crank.

5. Mechanism according to claim 1 wherein said trigger includes an interposer arm adapted upon rocking of the trigger to move into position to disengage said clutch.

6. Mechanism according to claim 5 including
a second cam on said shaft and revoluble therewith, said independent means including
a follower for said second cam,
a driver mounted on said second follower for driving said element subsequent to its initial operation by said first follower and conditionable for operation upon rotation of said second cam, and
spring means for driving said second follower and accordingly said driver to further shift said element upon permissive rotation of said second cam.

7. Mechanism according to claim 1 wherein said responsive means includes a cam and a drive spring.

8. A case shift mechanism for an electric typewriter having a power driven shaft and an elevatable carriage, in combination,
a frame on which said carriage is elevatably mounted, means operated by said shaft for partially elevating said carriage,
and means associated with said first means and operable subsequent to said partial elevating to complete the elevation of said carriage.

9. Mechanism according to claim 8 wherein said second means includes a spring driven driving member.

10. Mechanism according to claim 8 wherein said operated means includes a cam and follower and an elevating member connected to said follower.

11. Mechanism according to claim 8 wherein said operated means includes a clutch and shift key operated means for engaging said clutch.

12. A case shift mechanism for an electric typewriter having a power driven shaft and an elevatable carriage, in combination,
a frame on which said carriage is elevatably mounted,
a cam on said shaft and revoluble therewith,
a follower associated with said cam and adapted to be moved upon rotation of said cam,
an element connected to said follower and to said carriage for partially elevating said carriage upon movement of said follower,
and means independent of said cam and its follower and operatively associated with said element for further elevating said carriage after the said partial elevation thereof.

13. Mechanism according to claim 12 wherein said element includes a cam surface and said independent means includes a driver for engaging said cam surface to drive said element to effect further elevation of said carriage.

14. Mechanism according to claim 13 including spring means for operating said driver.

References Cited by the Examiner
FOREIGN PATENTS
690,900  4/40  Germany.

ROBERT E. PULFREY, *Primary Examiner.*